United States Patent
Gao et al.

(10) Patent No.: US 11,463,184 B2
(45) Date of Patent: Oct. 4, 2022

(54) INTERFERENCE DETERMINING METHOD AND NETWORK DEVICE

(71) Applicant: HUAWEI TECHNOLOGIES CO., LTD., Guangdong (CN)

(72) Inventors: Quanzhong Gao, Shanghai (CN); Wei Chen, Shanghai (CN); Kai Xu, Shanghai (CN); Liwen Zhang, Shanghai (CN); Shuqin Xiao, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 246 days.

(21) Appl. No.: 16/869,189

(22) Filed: May 7, 2020

(65) Prior Publication Data
US 2020/0266909 A1 Aug. 20, 2020

Related U.S. Application Data

(63) Continuation of application No. PCT/CN2018/111032, filed on Oct. 19, 2018.

(30) Foreign Application Priority Data

Nov. 7, 2017 (CN) .......................... 201711082165.8

(51) Int. Cl.
  *H04B 17/345* (2015.01)
  *H04W 72/04* (2009.01)
  *H04W 72/08* (2009.01)

(52) U.S. Cl.
  CPC ...... *H04B 17/345* (2015.01); *H04W 72/0453* (2013.01); *H04W 72/082* (2013.01)

(58) Field of Classification Search
None
See application file for complete search history.

(56) References Cited

U.S. PATENT DOCUMENTS

| 2010/0081448 | A1 | 4/2010 | Wong et al. |
| 2013/0044621 | A1 | 2/2013 | Jung et al. |

(Continued)

FOREIGN PATENT DOCUMENTS

| CN | 103687040 A | 3/2014 |
| CN | 104584665 A | 4/2015 |

(Continued)

OTHER PUBLICATIONS

Extended European Search Report issued in European Application No. 18876888.1 dated Nov. 20, 2020, 11 pages.

(Continued)

*Primary Examiner* — Jenkey Van
(74) *Attorney, Agent, or Firm* — Fish & Richardson P.C.

(57) ABSTRACT

An interference determining method, includes: obtaining first frequency information of a first resource; obtaining second frequency information of a second resource, where a frequency indicated by the first frequency information is lower than a frequency indicated by the second frequency information; determining, based on the first frequency information, harmonic frequency information corresponding to the first resource; and determining, based on the harmonic frequency information and the second frequency information, harmonic interference information between the first resource and the second resource.

17 Claims, 8 Drawing Sheets

(56) References Cited

U.S. PATENT DOCUMENTS

| | | | |
|---|---|---|---|
| 2014/0153433 A1 | 6/2014 | Zhou | |
| 2020/0120678 A1* | 4/2020 | Zhou | H04L 27/0014 |
| 2020/0127692 A1* | 4/2020 | Zhang | H04L 1/0004 |
| 2020/0314657 A1* | 10/2020 | Kimba Dit Adamou | ................ |
| | | | H04W 16/14 |
| 2021/0153214 A1* | 5/2021 | Zhang | H04B 1/50 |

FOREIGN PATENT DOCUMENTS

| | | |
|---|---|---|
| CN | 104601253 A | 5/2015 |
| CN | 105866543 A | 8/2016 |
| CN | 107222226 A | 9/2017 |
| CN | 107295674 A | 10/2017 |
| EP | 3637899 A1 | 4/2020 |
| EP | 3644542 A1 | 4/2020 |
| WO | 2014067131 A1 | 5/2014 |
| WO | 2015062419 A1 | 5/2015 |

OTHER PUBLICATIONS

Office Action issued in Chinese Application No. 201711082165.8 dated Feb. 2, 2021, 11 pages (with English translation).

Vivo, "Offline discussions and proposals on harmonic interference handling," 3GPP TSG-RAN WG1 NR_AH #3, R1-1716696, Agenda item 6.6, Nagoya, Japan, Sep. 18-21, 2017, 11 pages.

Office Action issued in Chinese Application No. 201711082165.8 dated Aug. 13, 2021, 5 pages.

3GPP TS 36.101 V15.0.0 (Sep. 2017), "3rd Generation Partnership Project;Technical Specification Group Radio Access Network; Evolved Universal Terrestrial Radio Access (E-UTRA); User Equipment (UE) radio transmission and reception(Release 15)," Sep. 2017, 1548 pages.

PCT International Search Report and Written Opinion issued in International Application No. PCT/CN2018/111032 dated Jan. 15, 2019, 14 pages (with English translation).

\* cited by examiner

_US 11,463,184 B2_

INTERFERENCE DETERMINING METHOD AND NETWORK DEVICE

CROSS-REFERENCE TO RELATED APPLICATIONS

This application a continuation of international Application No. PCT/CN2018/111032, filed on Oct. 19, 2018, which claims priority to Chinese Patent Application No. 201711082165.8, filed on Nov. 7, 2017. The disclosures of the aforementioned applications are hereby incorporated by reference in their entireties.

TECHNICAL FIELD

This application relates to the field of communications technologies, and in particular, to an interference determining method and a network device.

BACKGROUND

In a device working process, because of non-linearity of components, when a working current flows through a load, the working current does not have a linear relationship with applied voltage. Consequently, anon-sinusoidal current is formed, and a harmonic is generated, for example, an N harmonic such as a second, third, or fourth harmonic is generated, where N is greater than 2. In addition, with emergence of carrier aggregation (Carrier Aggregation, CA for short), it is possible that uplink and downlink spectrum resources allocated to a same terminal at a same moment, for example, in a same transmission time interval (Transmission Time Interval, TTI for short), belong to different carriers in different frequency bands. When a base station allocates uplink and downlink resources, if twice of an uplink frequency is exactly equal to a downlink frequency, it indicates that a second harmonic of an uplink signal of a terminal exactly hits a downlink receiving frequency, causing second harmonic interference. As a result, downlink receiving quality is severely degraded.

Currently, for harmonic interference introduced by CA, uplink and downlink resources may be allocated to a same terminal in a time division scheduling manner, so that an uplink resource and a downlink resource are allocated to a same terminal in different TTIs, to avoid the second harmonic interference. However, in the time division scheduling solution, a period of uplink and downlink integrated scheduling of the terminal is prolonged, which reduces information transmission efficiency of a system.

SUMMARY

Embodiments of the present invention provide an interference determining method and a network device, to help resolve a harmonic interference problem and improve information transmission efficiency of a system.

According to a first aspect, an embodiment of the present invention provides an interference determining method. The method includes: obtaining, by a network device, first frequency information of a first resource and second frequency information of a second resource; determining, based on the first frequency information, harmonic frequency information corresponding to the first resource; and determining, based on the harmonic frequency information and the second frequency information, harmonic interference information between the first resource and the second resource. Therefore, resource selection can be performed based on the harmonic interference information, which helps resolve a harmonic interference problem, improve resource selection reliability, and improve information transmission efficiency of a system.

A frequency indicated by the first frequency information is lower than a frequency indicated by the second frequency information. For example, the first resource may be an uplink resource, and the second resource may be a downlink resource. Optionally, the frequency information, for example, the first frequency information and the second frequency information, in this application may include information such as a start frequency and an end frequency.

In a possible design, the first resource may be an allocated resource, and the second resource may be a candidate resource. Alternatively, the first resource may be a candidate resource, and the second resource may be an allocated resource. For example, the first resource may be an allocated uplink resource, and the second resource may be a to-be-allocated downlink resource. Alternatively, the first resource may be a to-be-allocated uplink resource, and the second resource may be an allocated downlink resource.

In a possible design, the first frequency information includes a first start frequency and a first end frequency, a harmonic may include a main lobe (main lobe) and a side lobe (side lobe), and the side lobe includes a left side lobe and a right side lobe. Further, the determining, by the network device based on the first frequency information, harmonic frequency information corresponding to the first resource may specifically be: calculating, based on the first start frequency, a start frequency of a main lobe of a harmonic that corresponds to the first resource, and calculating an end frequency of the main lobe based on the first end frequency; and/or calculating a start frequency of a left side lobe of the harmonic based on the first start frequency and the first end frequency, and calculating an end frequency of the left side lobe based on the first start frequency; and/or calculating a start frequency of a right side lobe of the harmonic based on the first end frequency, and calculating an end frequency of the right side lobe based on the first start frequency and the first end frequency. Therefore, the network device can calculate, based on the first start frequency and/or the first end frequency, frequency information such as a start frequency and an end frequency of the harmonic that corresponds to the first resource.

In a possible design, the second frequency information may include a second start frequency and a second end frequency. Further, the determining, by the network device based on the harmonic frequency information and the second frequency information, harmonic interference information between the first resource and the second resource may specifically be: determining that first harmonic interference exists between the first resource and the second resource if the second start frequency is greater than or equal to the start frequency of the main lobe and less than the end frequency of the main lobe, which may indicate that the second resource is in (belongs to) a main lobe area of the harmonic that corresponds to the first resource; or determining that first harmonic interference exists between the first resource and the second resource if the second end frequency is greater than the start frequency of the main lobe and less than or equal to the end frequency of the main lobe; and determining that second harmonic interference exists between the first resource and the second resource if the second start frequency is greater than or equal to the end frequency of the right side lobe; or determining that second harmonic interference exists between the first resource and the second resource if the second end frequency is less than or equal to the start frequency of the left side lobe. Interference intensity of the first harmonic interference is higher than interference intensity of the second harmonic interference. Therefore, a harmonic interference status between the first resource and the second resource can be determined, to perform resource selection or allocation based on the harmonic interference status.

In a possible design, the first resource may be an allocated resource of user equipment, and the second resource may be a candidate resource of the user equipment. Further, when the network device determines, based on the harmonic frequency information and the second frequency information, the harmonic interference information between the first resource and the second resource, if the second resource is a resource that is different from a resource corresponding to the first harmonic interference and a resource corresponding to the second harmonic interference and that is in a candidate resource set, the network device may further determine that third harmonic interference exists between the first resource and the second resource. The candidate resource set includes at least one candidate second resource, the interference intensity of the first harmonic interference is higher than interference intensity of the third harmonic interference, and the interference intensity of the third harmonic interference is higher than the interference intensity of the second harmonic interference. Therefore, the harmonic interference status between the first resource and the second resource is further determined, to perform resource selection or allocation.

In a possible design, the first resource may be a candidate resource of user equipment, and the second resource may be an allocated resource of the user equipment. Further, when the network device determines, based on the harmonic frequency information and the second frequency information, the harmonic interference information between the first resource and the second resource, if the second start frequency is greater than or equal to the start frequency of the left side lobe and less than the end frequency of the left side lobe, the network device may further determine that third harmonic interference exists between the first resource and the second resource; and/or if the second end frequency is greater than the start frequency of the left side lobe and less than or equal to the end frequency of the left side lobe, the network device may determine that third harmonic interference exists between the first resource and the second resource; and/or if the second start frequency is greater than or equal to the start frequency of the right side lobe and less than the end frequency of the right side lobe, the network device may determine that third harmonic interference exists between the first resource and the second resource; and/or if the second end frequency is greater than the start frequency of the right side lobe and less than or equal to the end frequency of the right side lobe, the network device may determine that third harmonic interference exists between the first resource and the second resource. The interference intensity of the first harmonic interference is higher than interference intensity of the third harmonic interference, and the interference intensity of the third harmonic interference is higher than the interference intensity of the second harmonic interference. Therefore, the harmonic interference status between the first resource and the second resource is further determined, to perform resource selection or allocation.

In a possible design, the allocated resource of the user equipment includes at least two discrete resources. Further, when the network device determines, based on the harmonic frequency information and the second frequency information, the harmonic interference information between the first resource and the second resource, if the first harmonic interference and the third harmonic interference exist between the first resource and the second resource, the network device may determine that the first harmonic interference exists between the first resource and the second resource; if the first harmonic interference and the second harmonic interference exist between the first resource and the second resource, the network device may determine that the first harmonic interference exists between the first resource and the second resource; and if the second harmonic interference and the third harmonic interference exist between the first resource and the second resource, the network device may determine that the third harmonic interference exists between the first resource and the second resource. Therefore, a problem of how to determine interference when resources overlap is resolved.

In a possible design, after the determining harmonic interference information between the first resource and the second resource, the network device may further modify quality of a candidate resource based on the harmonic interference information, and determine, in a candidate resource set, a resource used by user equipment. The candidate resource may be the first resource or the second resource, and the candidate resource set includes at least one modified candidate resource. In this way, resource selection or allocation is implemented, to improve resource selection reliability, and further improve information transmission efficiency.

According to another aspect, an embodiment of the present invention provides a network device. The network device has a function of implementing behavior of a first network element in the foregoing method example. The function may be implemented by hardware, or may be implemented by hardware by executing corresponding software. The hardware or the software includes one or more units or modules corresponding to the foregoing function.

In a possible design, a structure of the network device includes an obtaining unit and a determining unit that are configured to support the network device in performing corresponding functions in the foregoing method. Optionally, the obtaining unit and the determining unit may be integrated into a processing unit. The network device may further include a communications unit and a storage unit. The communications unit is configured to support communication between the network device and another device. The storage unit is configured to be coupled to the processing unit, and stores a program instruction and data that are necessary for the network device. For example, the obtaining unit and the determining unit (processing unit) may be a processor, the communications unit may be a transceiver, and the storage unit may be a memory.

According to still another aspect, an embodiment of the present invention provides a communications system. The system includes the network device in the foregoing aspects and the user equipment. In another possible design, the system may further include another device that interacts with the network device or the user equipment in the solutions provided in the embodiments of the present invention.

According to still another aspect, an embodiment of the present invention provides a computer storage medium, configured to store a computer software instruction used by the foregoing network device. The computer storage medium includes a program designed for executing the foregoing aspects.

According to still another aspect, this application further provides a computer program product that includes an instruction. When the computer program product is run on a computer, the computer is enabled to perform the method in the foregoing aspect.

According to still another aspect, this application provides a chip system. The chip system includes a processor, used by a network device to implement functions in the foregoing aspects, for example, determining data and/or information in the foregoing method. In a possible design, the chip system further includes a memory. The memory is configured to store a program instruction and data that are necessary for a network device. The chip system may include a chip, or may include a chip and another discrete component.

Compared with the prior art, in the solutions provided in the embodiments of the present invention, the network device can obtain the frequency information of the first resource and the frequency information of the second resource; calculate, based on the frequency information of the first resource that indicates the lower frequency, the harmonic frequency information corresponding to the first resource; and further determine, based on the harmonic frequency information and the second frequency information, the harmonic interference information between the first resource and the second resource, to perform resource selection based on the harmonic interference information. This helps resolve a harmonic interference problem, improve resource selection reliability, and improve information transmission efficiency of a system.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

Figure 1:
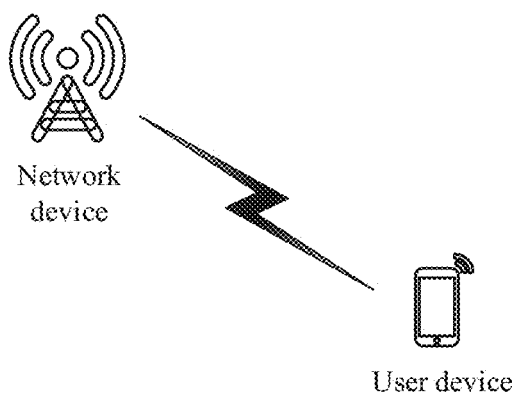
FIG. 1 is an architectural diagram of a communications system according to an embodiment of the present invention.

The following describes the embodiments of the present invention with reference to the accompanying drawings in the embodiments of the present invention.

It should be understood that the technical solutions of this application may be specifically applied to various communications networks, for example, a global system for mobile communications (English: Global System of Mobile communication, GSM for short), code division multiple access (English: Code Division Multiple Access, CDMA for short), wideband code division multiple access (English: Wideband Code Division Multiple Access, WCDMA for short), time division-synchronous code division multiple access (English: Time Division-Synchronous Code Division Multiple Access, TD-SCDMA for short), universal mobile telecommunications system (English: Universal Mobile Telecommunication System, UMTS for short), and a long term evolution (English: Long Term Evolution, LTE for short) network. With continuous development of communications technologies, the technical solutions in this application may be further applied to a future network, for example, a fifth generation mobile communication technology (English: The Fifth Generation Mobile Communication Technology, 5G for short) network, which may also be referred to as a new radio (English: New Radio, NR for short) network, or may be used in a D2D (device to device) network, an M2M (machine to machine) network, or the like.

A network device in this application may be an entity that is on a network side and that is used to send or receive information, for example, may be a base station, or may be a transmission point (English: Transmission point, TP for short), a transmission reception point (English: transmission and receiver point, TRP for short), a relay device, or another network device having a base station function.

In this application, user equipment (English: User Equipment, UE for short) is a device having a communication function, and may include a handheld device that has a wireless communication function, a vehicle-mounted device, a wearable device, a computing device, another processing device connected to a wireless modem, or the like. Terminal devices in different networks may have different names, for example, a terminal, a terminal device, a mobile station, a subscriber unit, a station, a cellular phone, a personal digital assistant, a wireless modem, a wireless communications device, a handheld device, a laptop computer, a cordless phone, and a wireless local loop station. The user equipment may refer to a wireless terminal or a wired terminal. The wireless terminal may be a device that provides a user with voice and/or data connectivity, a handheld device with a wireless connection function, or another processing device connected to a wireless modem. The wireless terminal may communicate with one or more core networks by using a radio access network (for example, RAN, radio access network).

In this application, a base station may also be referred to as a base station device, and the base station device is a device that is deployed in a radio access network to provide a wireless communication function. Names of base stations in different radio access systems may be different. For example, a base station in a universal mobile telecommunications system (Universal Mobile Telecommunications System, UMTS for short) network is referred to as a NodeB (NodeB), a base station in an LTE network is referred to as an evolved NodeB. (evolved NodeB, eNB or eNodeB for short), and a base station in a future 5G system may be referred to as a transmission reception point (Transmission Reception Point, TRP for short) network node or a g-NodeB (g-NodeB, gNB). Details are not listed one by one herein.

The following describes an application scenario of this application. FIG. 1 is an architectural diagram of a communications system according to an embodiment of the present invention. Specifically, as shown in FIG. 1, the communications system includes user equipment and a network device, and information may be transmitted between the user equipment and the network device. Optionally, the communications system may further include another device. For example, in a dual connectivity scenario, when the network device is a base station, the communications system may further include another base station connected to the user equipment. For another example, the communications system may further include one or more core network devices.

When the network device communicates with the user equipment, there may be harmonic interference problem. For example, the harmonic interference problem exists in a dual connectivity (Dual Connectivity, DC for short) technology, a 5G uplink and downlink decoupling technology, and the like. Therefore, when allocating an uplink resource and a downlink resource, the network device may obtain frequency information of a harmonic that corresponds to an uplink resource in a low frequency band, and compare the frequency information of the harmonic with frequency information of a downlink resource in a high frequency band, to allocate the uplink resource and/or the downlink resource, so that the harmonic interference problem is resolved. Harmonics may include an even harmonic and an odd harmonic. For example, a third harmonic, a fifth harmonic, and a seventh harmonic are odd harmonics, and a second harmonic, a fourth harmonic, a sixth harmonic, and an eighth harmonic are even harmonics. Assuming that a frequency of an uplink resource is used as a fundamental wave frequency, and the fundamental wave frequency is 50 Hz, a frequency of a second harmonic that corresponds to the uplink resource is 100 Hz.

In this application, a "resource", for example, the uplink resource and the downlink resource, may be a frequency domain resource or a time-frequency resource, and may be in a unit of a transport block (Transport Block, TB for short), a resource block (Resource Block, RB for short), or another granularity. In this application, an example in which an RB is used as a unit is used for description.

Figure 2:
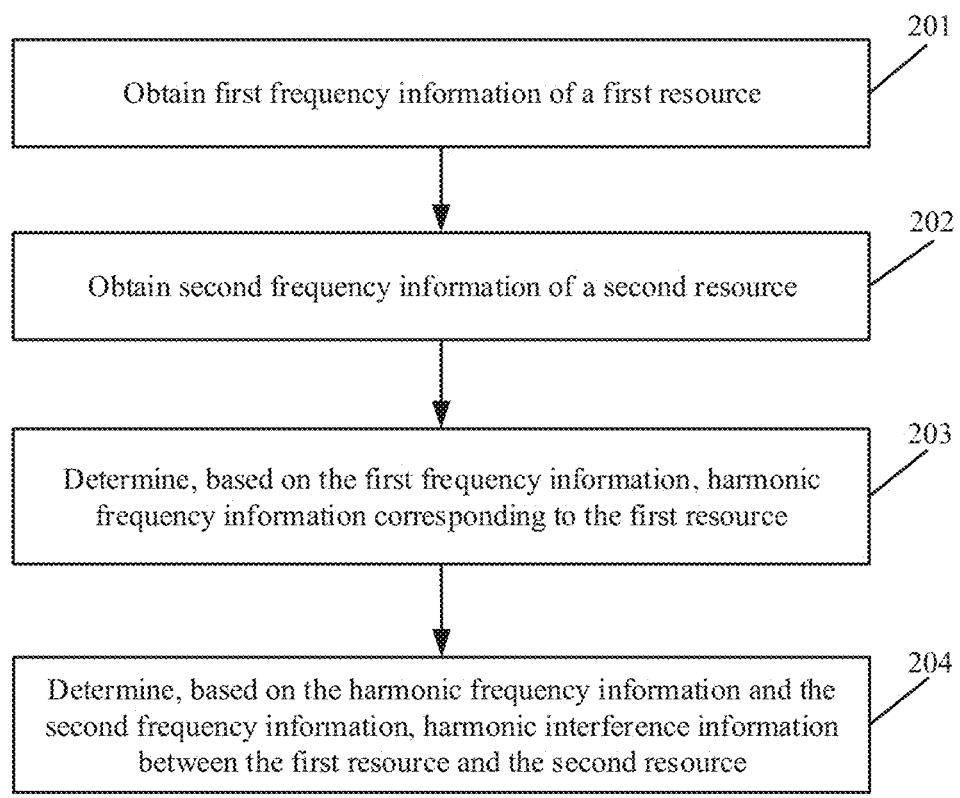
FIG. 2 is a schematic flowchart of an interference determining method according to an embodiment of the present invention.

This application discloses a control information interference determining method and a network device, to help resolve a harmonic interference problem and improve information transmission efficiency of a system. Details are separately described as follows:

FIG. 2 is a schematic flowchart of an interference determining method according to an embodiment of the present invention. Specifically, the interference determining method in this embodiment of the present invention may be applied to the foregoing network device such as a base station. As shown in FIG. 2, the interference determining method in this embodiment of the present invention may include the following steps.

201. Obtain first frequency information of a first resource.

202. Obtain second frequency information of a second resource.

A frequency corresponding to the first resource (that is, a frequency indicated by the first frequency information) is lower than a frequency corresponding to the second resource (that is, a frequency indicated by the second frequency information). For example, the first resource may be an uplink resource, and the second resource may be a downlink resource. Optionally, the frequency information, for example, the first frequency information and the second frequency information, in this application may include information such as a start frequency and an end frequency. Further, optionally, that the frequency indicated by the first frequency information is lower than the frequency indicated by the second frequency information may mean that both a start frequency and an end frequency of the first resource are lower than a start frequency and an end frequency of the second resource.

203. Determine, based on the first frequency information, harmonic frequency information corresponding to the first resource.

Optionally, the first resource may be an allocated resource, and the second resource may be a candidate resource. Alternatively, the first resource may be a candidate resource, and the second resource may be an allocated resource. For example, the first resource may be an allocated uplink resource, and the second resource may be a to-be-allocated downlink resource. Alternatively, the first resource may be a to-be-allocated uplink resource, and the second resource may be an allocated downlink resource.

Further, optionally, the first frequency information may include the start frequency of the first resource, that is, a first start frequency, and the end frequency of the first resource, that is, a first end frequency. The calculating, by the network device based on the first frequency information, harmonic frequency information corresponding to the first resource may specifically be: calculating, based on the first start frequency and/or the first end frequency, a start frequency and an end frequency of a harmonic that corresponds to the first resource. Specifically, the harmonic may include a main lobe (main lobe) and a side lobe (side lobe), and the side lobe includes a left side lobe and a right side lobe. The network device may calculate, based on the first start frequency, a start frequency of a main lobe of the harmonic that corresponds to the first resource, and calculate an end frequency of the main lobe based on the first end frequency; and/or calculate a start frequency of a left side lobe of the harmonic based on the first start frequency and the first end frequency, and calculate an end frequency of the left side lobe based on the first start frequency; and/or calculate a start frequency of a right side lobe of the harmonic based on the first end frequency, and calculate an end frequency of the right side lobe based on the first start frequency and the first end frequency. Therefore, the network device may separately determine frequency information of the main lobe, the left side lobe, and the right side lobe of the harmonic.

204. Determine, based on the harmonic frequency information and the second frequency information, harmonic interference information between the first resource and the second resource.

Further, when the network device determines, based on the harmonic frequency information and the second frequency information, the harmonic interference information between the first resource and the second resource, the network device may compare the harmonic frequency with the second frequency information. The second frequency information may include the start frequency of the second resource, that is, a second start frequency, and the end frequency of the second resource, that is, a second end frequency. If the second start frequency is greater than or equal to the start frequency of the main lobe and less than the end frequency of the main lobe, the network device may determine that first harmonic interference exists between the first resource and the second resource, that is, the second resource is in a main lobe area of the harmonic that corresponds to the first resource, for example, a candidate resource (the first resource or the second resource) is a resource in the main lobe area or a main lobe of a harmonic of a candidate resource may hit an allocated resource; or if the second end frequency is greater than the start frequency of the main lobe and less than or equal to the end frequency of the main lobe, the network device determines that first harmonic interference exists between the first resource and the second resource. If the second start frequency is greater than or equal to the end frequency of the right side lobe, the network device determines that second harmonic interference exists between the first resource and the second resource, for example, a candidate resource is a resource in a non-interference area or a harmonic of a candidate resource does not hit an allocated resource or if the second end frequency is less than or equal to the start frequency of the left side lobe, the network device determines that second harmonic interference exists between the first resource and the second resource. Interference intensity of the first harmonic interference is higher than interference intensity of the second harmonic interference.

Optionally, the first resource may be an allocated resource of user equipment, for example, an allocated uplink resource, and the second resource may be a candidate resource of the user equipment, for example, a to-be-allocated downlink resource. Further, when the network device determines, based on the harmonic frequency information and the second frequency information, the harmonic interference information between the first resource and the second resource, if the second resource is a resource that is different from a resource corresponding to the first harmonic interference and a resource corresponding to the second harmonic interference and that is in a candidate resource set, the network device may determine that third harmonic interference exists between the first resource and the second resource, that is, the candidate resource is a resource in a side lobe area or a side lobe of a harmonic of the candidate resource may hit the allocated resource. The candidate resource set may include at least one candidate second resource.

Optionally, the first resource may be a candidate resource of user equipment, for example, a to-be-allocated uplink resource, and the second resource may be an allocated resource of the user equipment, for example, an allocated downlink resource. Further, when the network device determines, based on the harmonic frequency information and the second frequency information, the harmonic interference information between the first resource and the second resource, if the second start frequency is greater than or equal to the start frequency of the left side lobe and less than the end frequency of the left side lobe, the network device determines that third harmonic interference exists between the first resource and the second resource; and/or if the second end frequency is greater than the start frequency of the left side lobe and less than or equal to the end frequency of the left side lobe, the network device may determine that third harmonic interference exists between the first resource and the second resource; and/or if the second start frequency is greater than or equal to the start frequency of the right side lobe and less than the end frequency of the right side lobe, the network device determines that third harmonic interference exists between the first resource and the second resource; and/or if the second end frequency is greater than the start frequency of the right side lobe and less than or equal to the end frequency of the right side lobe, the network device determines that third harmonic interference exists between the first resource and the second resource.

The interference intensity of the first harmonic interference is higher than interference intensity of the third harmonic interference, and the interference intensity of the third harmonic interference is higher than the interference intensity of the second harmonic interference. That is, harmonic interference received by the user equipment on a resource in the main lobe area is higher than harmonic interference received on a resource in the side lobe area, and the harmonic interference received by the user equipment on the resource in the side lobe area is higher than harmonic interference received on a resource in another area such as a non-interference area or an area with smaller interference. Optionally, frequency information of each resource area may be separately determined based on frequency information of the first resource.

Further, optionally, the allocated resource of the user equipment may be a continuous resource or a discrete resource. If the allocated resource of the user equipment includes at least two discrete resources (the first resource or the second resource), when the network device determines, based on the harmonic frequency information and the second frequency information, the harmonic interference information between the first resource and the second resource, if the first harmonic interference and the third harmonic interference exist between the first resource and the second resource, the network device determines that the first harmonic interference exists between the first resource and the second resource; if the first harmonic interference and the second harmonic interference exist between the first resource and the second resource, the network device determines that the first harmonic interference exists between the first resource and the second resource; and if the second harmonic interference and the third harmonic interference exist between the first resource and the second resource, the network device determines that the third harmonic interference exists between the first resource and the second resource. That is, if it is determined that a resource belongs to a plurality of resource areas, an area with strongest interference in the plurality of resource areas may be used as an area to which the resource belongs.

Further, optionally, after the determining harmonic interference information between the first resource and the second resource, the network device may further modify quality of a candidate resource based on the harmonic interference information, and determine, in a candidate resource set, a resource used by user equipment. The candidate resource is the first resource or the second resource, and the candidate resource set may include at least one modified candidate resource. Specifically, after determining the harmonic interference information of the candidate resource and the allocated resource, the network device may perform resource selection based on the harmonic interference information. Therefore, when selecting, in candidate resources, a resource used by the user equipment, the network device may preferentially select a candidate resource with smallest harmonic interference, that is, a candidate resource corresponding to the second harmonic interference, and then select a candidate resource corresponding to the third harmonic interference, to avoid selecting a candidate resource corresponding to the first harmonic interference.

In this embodiment of the present invention, the network device can separately obtain the frequency information of the first resource and the frequency information of the second resource; calculate, based on frequency information of the first resource that indicates the lower frequency, the harmonic frequency information corresponding to the first resource; and further determine, based on the harmonic frequency information and the second frequency information, the harmonic interference information between the first resource and the second resource, to perform resource selection based on the harmonic interference information. This helps resolve a harmonic interference problem, improve resource selection reliability, and improve information transmission efficiency of a system.

For example, for a Sub-6G spectrum, frequency band combinations that may cause second harmonic self-interference include Band 8 and Band 3, Band 3 and Band 42, and Band 9 and Band 43, as shown in the following.

Band 8+Band 3: $2 \times TxFre_{B8} = RxFre_{B3}$
Band 3+Band 42: $2 \times TxFre_{B3} = RxFre_{B42}$
Band 9+Band 43: $2 \times TxFre_{B_9} = RxFre_{B43}$ $TxFre_{Bi}$ indicates a frequency on which a terminal transmits a signal in Band i, and $RxFre_{Bj}$ indicates a frequency on which the terminal receives a signal in Band j.

The band refers to a frequency band. Frequency information corresponding to each band is obtained according to protocol specifications. Certainly, a harmonic interference problem may also exist in a frequency band higher than 6 GHz or another frequency band, which is not listed one by one herein.

Figure 3A:
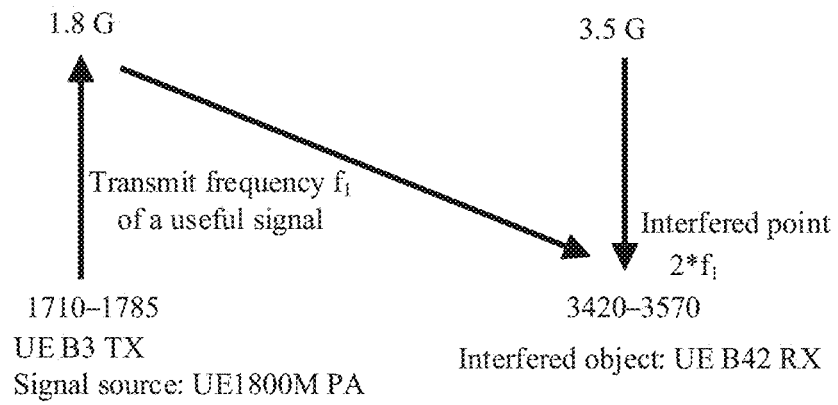
FIG. 3a is a schematic diagram of a harmonic interference scenario according to an embodiment of the present invention.
Figure 3B:
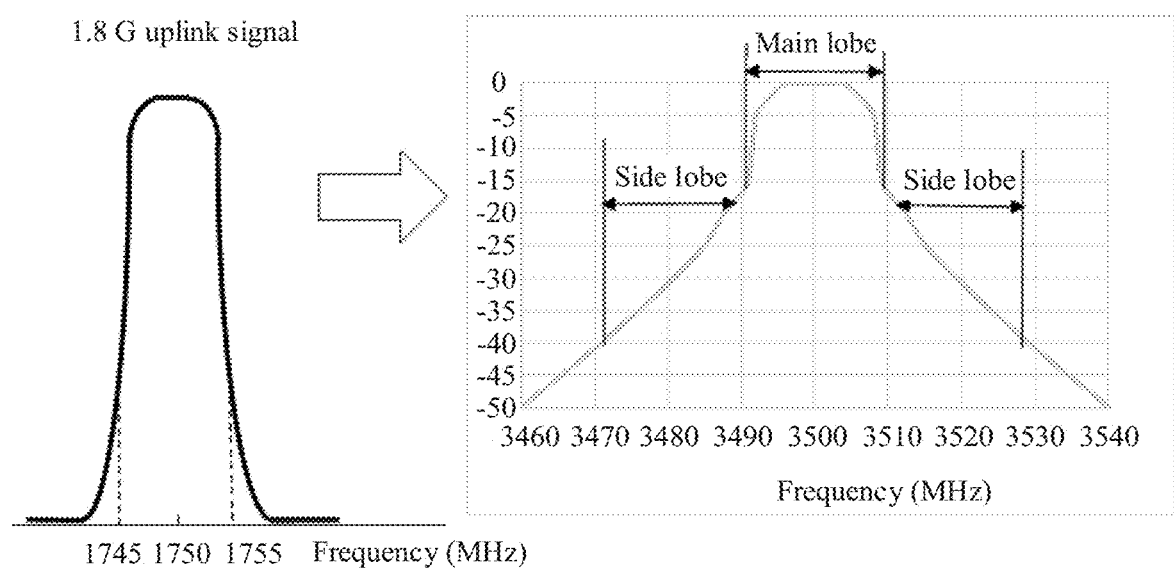
FIG. 3b is a schematic structural diagram of a harmonic according to an embodiment of the present invention.

An example in which an uplink resource is 1.8 GHz and a downlink resource is 3.5 GHz is used. FIG. 3a is a schematic diagram of a harmonic interference scenario according to an embodiment of the present invention. Further, refer to FIG. 3b. As shown in FIG. 3b, a frequency corresponding to a 1.8 GHz uplink signal is 1745 MHz (a start frequency) to 1755 MHz (an end frequency). In frequency domain, a main lobe (main lobe) width of a second harmonic corresponding to the 1.8 G uplink signal (a source signal) is twice a spectrum of a source signal, a frequency of the second harmonic is about 3490 MHz (a start frequency) to 3510 MHz (an end frequency); and a side lobe (a side lobe) of the second harmonic corresponding to the 1.8 G uplink signal is about four times (that is, two times on the left side and two times on the right side of the main lobe) of the spectrum of the source signal. A power spectrum density of a main lobe interference signal is relatively large. If an RB in the area is scheduled, spectral efficiency decreases significantly. Interference intensity of the side lobe is smaller than that of the main lobe, and an RB in the area can be used after reduction.

Figure 3C:
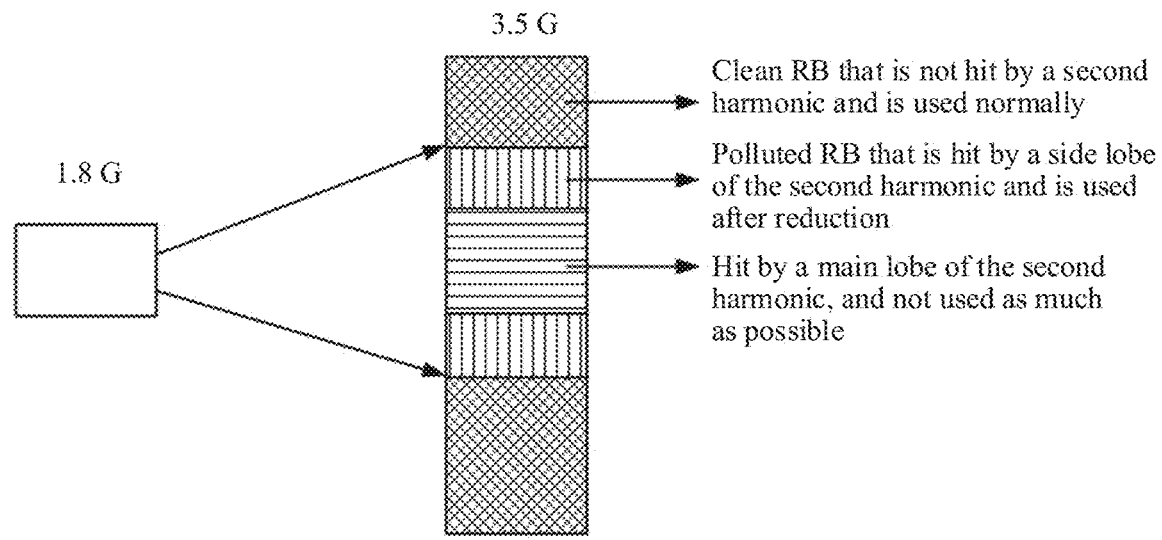
FIG. 3c is a schematic diagram of a harmonic area according to an embodiment of the present invention.

Therefore, in this application, a coordinated scheduling solution may be used to calculate, based on an uplink RB number in a low frequency band (for example, 1.8 G) allocated to a user, downlink interference of a second harmonic of the uplink RB to a high frequency band carrier (for example, 3.5 G), and different usage policies are used for different RBs, to maximize spectral efficiency. As shown in FIG. 3c, in this application, an RB may be allocated or used by determining a resource such as an RB that is not hit by a harmonic, an RB that is hit by a harmonic side lobe, and an RB that is hit by a harmonic main lobe.

Figure 4:
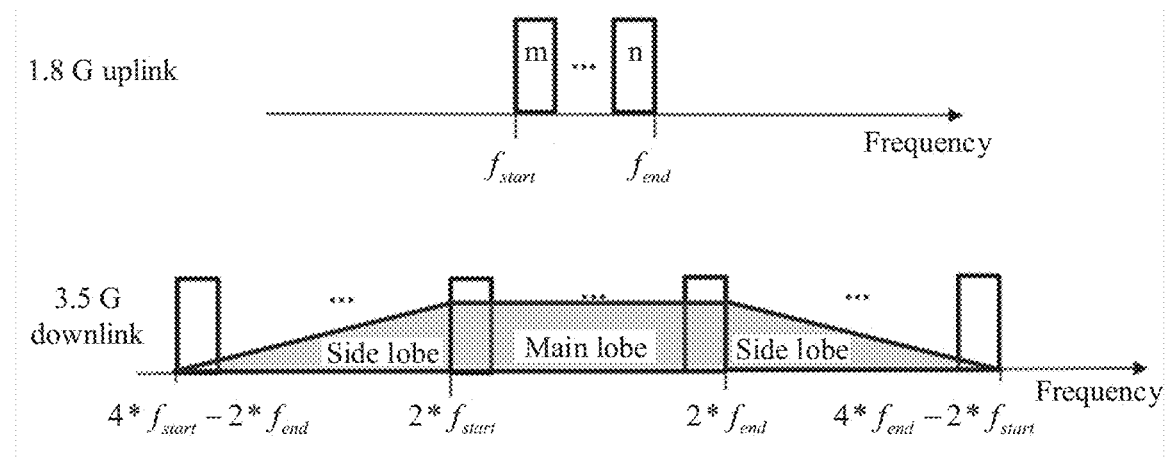
FIG. 4 is a schematic diagram of another harmonic interference scenario according to an embodiment of the present invention.

The following describes in detail the interference determining method in this application by using an example in which a 1.8 G uplink signal and a 3.5 G downlink signal are scheduled, that is, a combination of Band 3 and Band 8 is scheduled. Specifically, as shown in FIG. 4, it is assumed that a standard of an uplink carrier in a 1.8 GHz frequency band (Band 3) is LTE, a center frequency of the uplink carrier is $F_{1.8G}$ (unit: MHz), and a bandwidth of the uplink carrier is $BandWidth_{1.8G}$. It is assumed that a standard of a downlink carrier of a 3.5 GHz frequency band (Band 42) is LTE, a center frequency of the downlink carrier is $F_{3.5G}$ (unit: MHz), and a bandwidth of the downlink carrier is $BandWidth_{3.5G}$.

Figure 5:
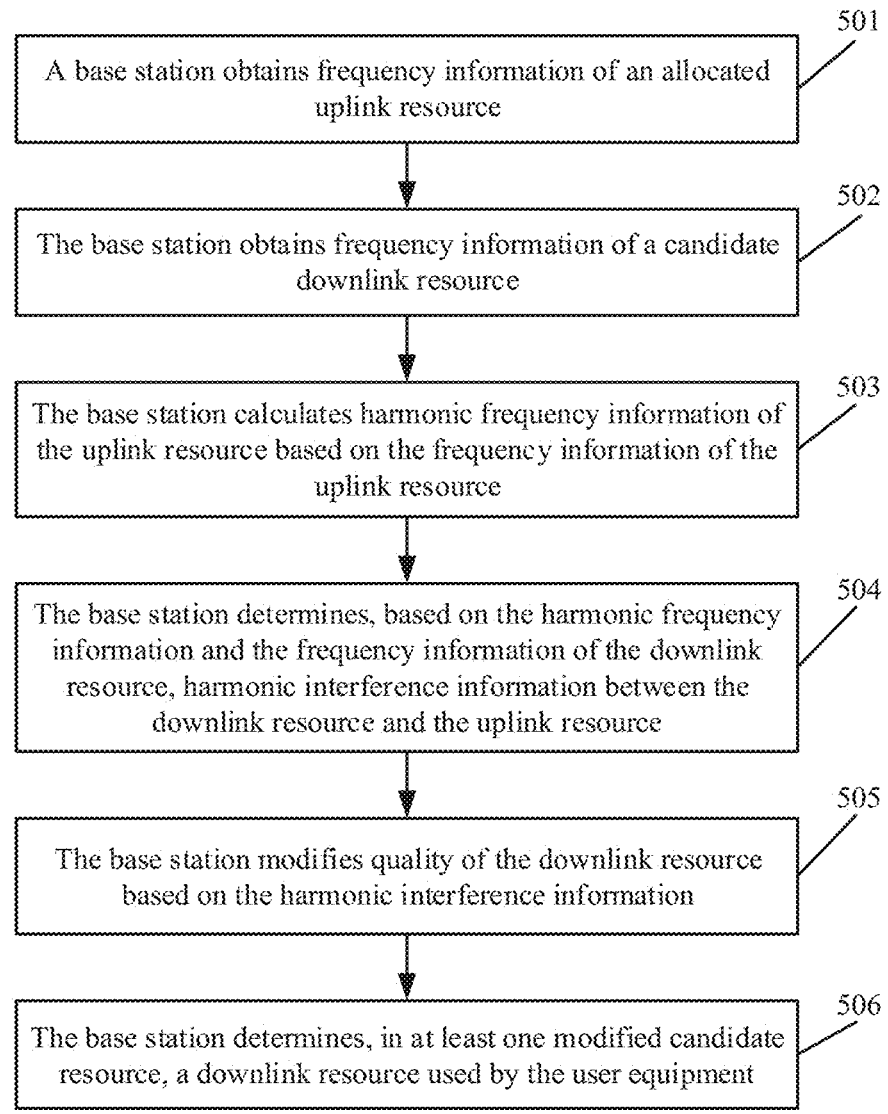
FIG. 5 is a schematic flowchart of another interference determining method according to an embodiment of the present invention.

FIG. 5 is a schematic flowchart of another interference determining method according to an embodiment of the present invention. Specifically, in this embodiment, a network device such as a base station may allocate an uplink resource and a downlink resource to UE in an uplink-first coordinated scheduling manner. In other words, the base station may first allocate the uplink resource and then select the downlink resource. Optionally, the uplink and downlink resources may be allocated at a same moment, for example, in a same TTI. As shown in FIG. 5, the interference determining method in this embodiment of the present invention may include the following steps.

501. The base station obtains frequency information of an allocated uplink resource.

Figure 6A:
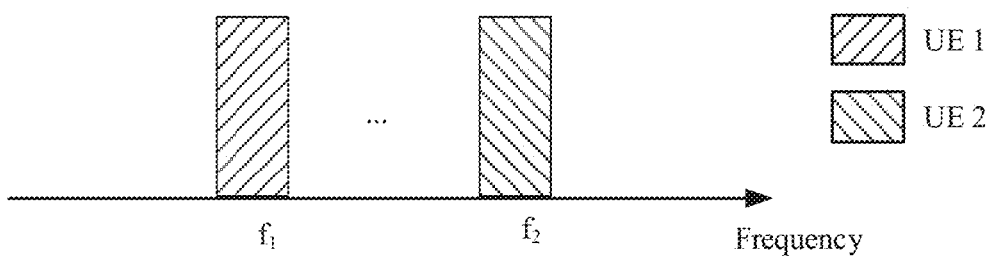
FIG. 6a is a schematic diagram of uplink resources allocated to UE according to an embodiment of the present invention.

It is assumed that the base station allocates uplink resources on a 1.8 GHz carrier, and an allocation result is shown in FIG. 6a. A frequency of an uplink resource allocated by the base station to UE 1 is $f_1$, and a frequency of an uplink resource allocated to UE 2 is $f_2$.

Specifically, the base station may sequentially calculate a frequency range of a 1.8 G uplink resource allocated to each LIE. Assuming that sequence numbers of RBs allocated to UE are m to n (that is, a first resource), a method for calculating a start frequency $f_{1.8start}$ (a first start frequency) and an end frequency $f_{1.8end}$ (a first end frequency) of the UE is as follows:

$$f_{1.8start} = F_{1.8G} - \frac{BandWidth_{1.8G}}{2} + BandWidth_{1.8G} \times 5\% + m \times 0.18$$

$$f_{1.8end} = F_{1.8G} - \frac{BandWidth_{1.8G}}{2} + BandWidth_{1.8G} \times 5\% + (n+1) \times 0.18$$

Optionally, if the uplink resources are discontinuously allocated, a quantity of start frequencies and a quantity of end frequencies that need to be calculated by the base station depend on a quantity of segments of allocated spectrum resources. That is, frequency information of the plurality of segments of resources is obtained. A correspondence between the RB numbers and the frequencies is applicable to LTE. A correspondence in NR may further be related to a subcarrier type and continuity and a size that are of a spectrum used by an NR cell. A specific method for calculating the frequency information of the resources is subject to a protocol.

502. The base station obtains frequency information of a candidate downlink resource.

Further, the base station may separately calculate a start frequency and an end frequency of each 3.5G downlink RB (a second resource), that is, calculate a second start frequency and a second end frequency of a candidate second resource. The start frequency $f_{3.5Sstart}$ and the end frequency $f_{3.5end}$ of the second resource may be calculated in the following manner:

$$f_{3.5RBStart}(x) = F_{3.5G} - \frac{BandWidth_{3.5G}}{2} + BandWidth_{3.5G} \times 5\% + x \times 0.18$$

$$f_{3.5RBEnd}(x) =$$
$$F_{3.5G} - \frac{BandWidth_{3.5G}}{2} + BandWidth_{3.5G} \times 5\% + (x+1) \times 0.18$$

x is an RB number, $f_{3.5RBstart}$ is a start frequency (that is, the second start frequency) corresponding to the RB, and $f_{3.5RBEnd}$ is an end frequency (that is, the second end frequency) corresponding to the RB.

503. The base station calculates harmonic frequency information of the uplink resource based on the frequency information of the uplink resource.

The harmonic frequency information may include main lobe (main lobe) frequency information and side lobe (side lobe) frequency information of a harmonic, and the side lobe frequency information includes left side lobe frequency information and right side lobe frequency information. The frequency information may include a start frequency, an end frequency, and the like.

Specifically, the base station may calculate main lobe and side lobe frequency information of a second harmonic corresponding to a 1.8G uplink resource.

$$f_{HarMainStart} = 2 \times f_{1.8start}$$

$$f_{HarMainEnd} = 2 \times f_{1.8end}$$

$$f_{HarLeftSideStart} = 4 \times f_{1.8start} - 2 \times f_{1.8end}$$

$$f_{HarLeftSideEnd} = 2 \times f_{1.8start}$$

$$f_{HarRightSideStart} = 2 \times f_{1.8end}$$

$$f_{HarRightSideEnd} = 4 \times f_{1.8end} - 2 \times f_{start}$$

Figure 6B:
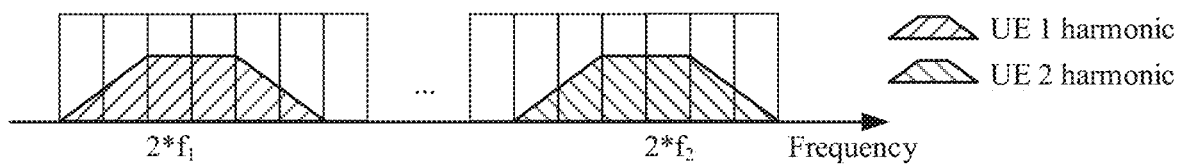
FIG. 6b is a schematic structural diagram of another harmonic according to an embodiment of the present invention.

$f_{HarMainStart}$ may represent a start frequency of a main lobe of the second harmonic, and $f_{HarMainEnd}$ may represent an end frequency of the main lobe of the second harmonic. $f_{HarLeftSideStart}$ may represent a start frequency of a side lobe (that is, a left side lobe) on the left of the main lobe, and $f_{HarLeftSideEnd}$ may represent an end frequency of the side lobe on the left of the main lobe. $f_{HarRightSideStart}$ may represent a start frequency of a side lobe (that is, a right side lobe) on the right of the main lobe, and $f_{HarRightSideEnd}$ may represent an end frequency of the side lobe on the right of the main lobe. If a plurality of segments of spectrum resources are allocated to one UE on a 1.8G carrier, the base station may sequentially calculate a harmonic frequency corresponding to each segment of uplink resources. For example, harmonic distribution corresponding to the 1.8G uplink resources of the UE 1 and the UE 2 may be shown in FIG. 6b.

504. The base station determines, based on the harmonic frequency information and the frequency information of the downlink resource, harmonic interference information between the downlink resource and the uplink resource.

Specifically, based on an interference status of each 3.5G downlink RB, the second harmonic may be divided into three types of areas: a main lobe area, a side lobe area, and a non-interference area. The main lobe area has the strongest RB interference and has worst quality; the side lobe area has smaller RB interference than the main lobe area, and has relatively poor quality; and the non-interference area has the smallest RB interference or no interference, and has the best quality.

Further, when one or both of the following two formulas are true, the base station may determine the RB as an RB in the main lobe area of the second harmonic, that is, first harmonic interference exists between the allocated 1.8G uplink resource and the RB (that is, a to-be-allocated downlink resource, also referred to a candidate RB):

$$f_{HarMainStart} \leq f_{3.5RBStart} \leq f_{HarMainEnd}$$

$$f_{HarMainStart} \leq f_{3.5RBEnd} \leq f_{HarMainEnd}$$

When at least one of the following two formulas is true, the base station may determine the candidate RB as an RB in the non-interference area of the second harmonic, that is, second harmonic interference exists between the allocated 1.8G uplink resource and the candidate RB, and interference intensity is the lowest or there is no interference:

$$f_{3.5RBStart} \geq f_{HarRightSideEnd}$$

$$f_{3.5RBEnd} \leq f_{HarLeftSideStart}$$

Further, if the candidate RB is neither the RB in the main lobe area nor the RB in the non-interference area, the base station may determine the RB as an RB in the side lobe area, that is, third harmonic interference exists between the allocated 1.8G-uplink resource and the candidate RB.

Optionally, if the 1.8G uplink resources are discontinuously allocated, two or more second harmonics may overlap in frequency domain. In this case, the base station needs to perform combination processing, and the base station may perform combination processing based on an area in which interference is more severe. For example, the uplink resources include an RB 1 and an RB 2. In 1.8G uplink, if a second harmonic main lobe of the RB 1 and a second harmonic side lobe of the RB 2 overlap in frequency domain, a resource attribute of an overlapping part is a main lobe. If a candidate RB belongs to the overlapping area, it may be determined that the candidate RB belongs to the main lobe area, that is, the first harmonic interference exists between the allocated 1.8G uplink resource and the candidate RB. In other words, if a 3.5G downlink candidate RB belongs to both a main lobe (for example, the main lobe corresponding to the RB 1) and a side lobe (for example, the side lobe corresponding to the RB 2), the base station may determine that the candidate RB belongs to the main lobe.

505. The base station modifies quality of the downlink resource based on the harmonic interference information.

506. The base station determines, in at least one modified candidate resource, a downlink resource used by the user equipment.

Figure 6C:
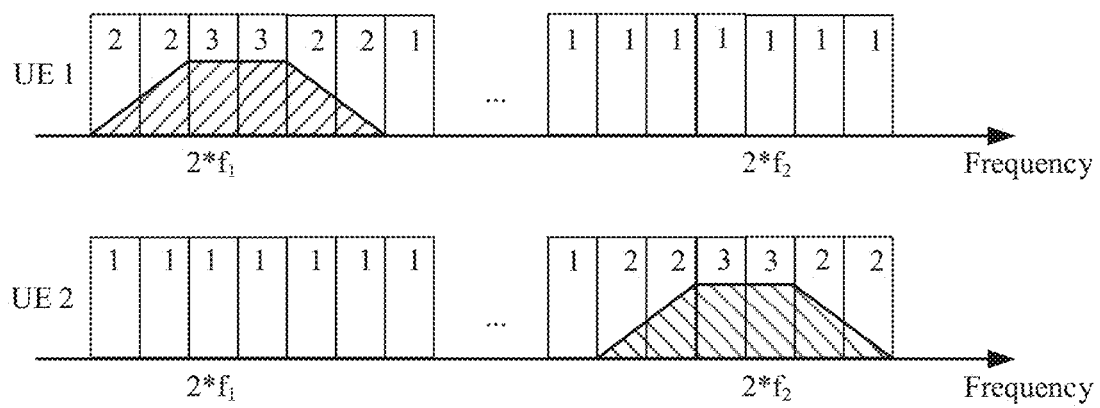
FIG. 6c is a schematic diagram of still another harmonic interference scenario according to an embodiment of the present invention.

Specifically, after determining second harmonic interference in each candidate 3.5G downlink resource, for example, an RB, that is, an area such as a main lobe, a side lobe, or a non-interference area to which the candidate 3.5G downlink resource belongs, the base station may modify quality of each candidate RB. It is assumed that quality of all candidate RBs is the same when the 1.8G uplink resource is not scheduled or the second harmonic interference is not superimposed. After the second harmonic interference is considered, an RB in the non-interference area has the best quality, followed by an RB in the side lobe area, and finally an RB in the main lobe area. As shown in FIG. 6c, "1" may indicate a non-interference area or smallest harmonic interference. "2" may indicate a side lobe or relatively small harmonic interference, and "3" may indicate a main lobe or relatively large harmonic interference. Alternatively, if quality of all candidate RBs is different when no 1.8G uplink resource is scheduled or second harmonic interference is not superimposed, the base station may modify the quality of each candidate RB based on the second harmonic interference, and then perform uplink resource selection or allocation. Therefore, the base station may select a downlink resource based on RB quality, for example, select an RB with best quality for the UE to perform downlink scheduling.

Figure 6D:
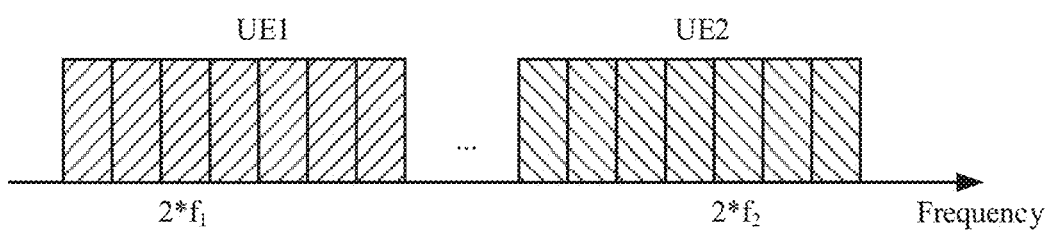
FIG. 6d is a schematic diagram of resource scheduling according to an embodiment of the present invention.

Further, optionally, the base station may further select an RB for the UE based on information such as a resource priority, a service priority, and a user priority, to perform 3.5G downlink scheduling, as shown in FIG. 6d.

In this embodiment of the present invention, when allocating the uplink resource and the downlink resource to the UE, the base station may first perform uplink resource allocation, and then perform downlink resource allocation. When allocating the downlink resource, with reference to interference of an uplink harmonic, the base station preferentially schedules an RB in a non-interference area, and then schedules an RB in a side lobe area, to avoid scheduling an RB in a main lobe area as far as possible. In this way, resource selection can be performed based on the harmonic interference information, which helps resolve a harmonic interference problem, improve resource selection reliability, and improve information transmission efficiency of a system.

Figure 7:
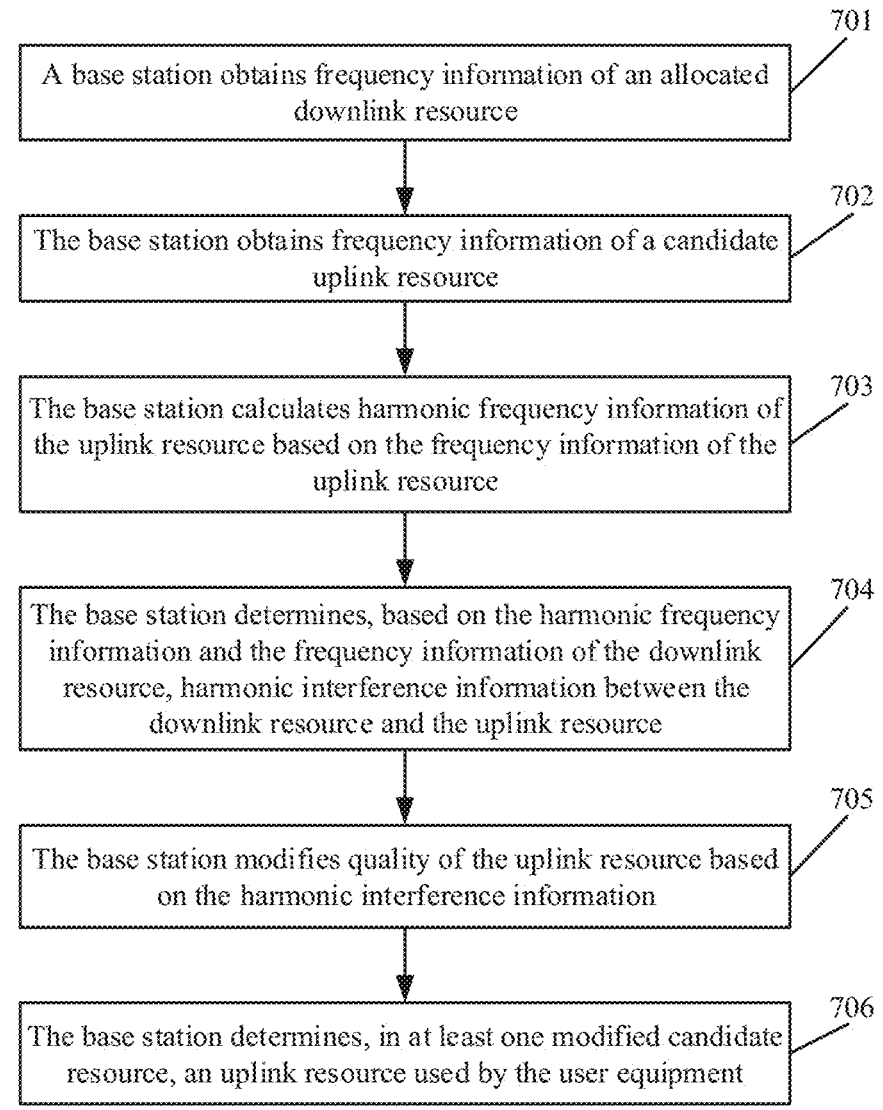
FIG. 7 is a schematic flowchart of still another interference determining method according to an embodiment of the present invention.

FIG. 7 is a schematic flowchart of still another interference determining method according to an embodiment of the present invention. Specifically, in this embodiment, a network device such as a base station may allocate an uplink resource and a downlink resource to UE in a downlink-first coordinated scheduling manner. In other words, the base station may first allocate the downlink resource and then select the uplink resource. The uplink and downlink resources may be allocated at a same moment, for example, in a same TTI. As shown in FIG. 7, the interference determining method in this embodiment of the present invention may include the following steps.

701. The base station obtains frequency information of an allocated downlink resource.

Figure 8A:
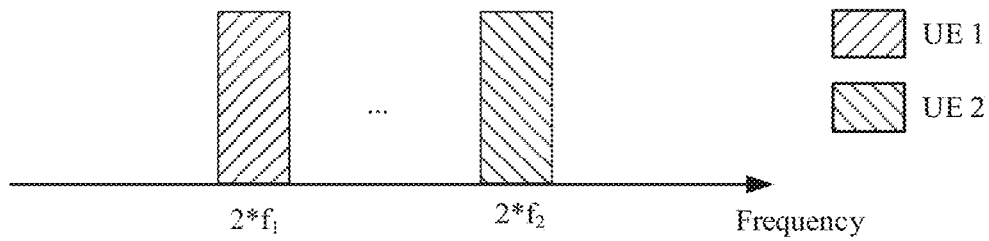
FIG. 8a is a schematic diagram of uplink resources allocated to UE according to an embodiment of the present invention.

It is assumed that the base station allocates downlink resources on a 3.5 GHz carrier, and an allocation result is shown in FIG. 8a. A frequency of a downlink resource allocated by the base station to UE 1 is $2*f_1$, and a frequency of a downlink resource allocated to UE 2 is $2*f_2$.

Specifically, the base station may sequentially calculate a frequency range of a 3.5G downlink resource allocated to each UE. Assuming that sequence numbers of RBs allocated to UE are in to n (that is, a second resource), a method for calculating a start frequency $f_{3.5start}$ and an end frequency $f_{3.5end}$ of the UE is as follows:

$$f_{3.5start} = F_{3.5G} - \frac{BandWidth_{3.5G}}{2} + BandWidth_{3.5G} \times 5\% + m \times 0.18$$

-continued
$$f_{3.5end} = F_{1.8G} - \frac{BandWidth_{3.5G}}{2} + BandWidth_{3.5G} \times 5\% + (n+1) \times 0.18$$

Optionally, if the downlink resources are discontinuously allocated, a quantity of start frequencies and a quantity of end frequencies that need to be calculated by the base station depend on a quantity of segments of allocated spectrum resources. That is, frequency information of the plurality of segments of resources is obtained.

702. The base station obtains frequency information of a candidate uplink resource.

Further, the base station may separately calculate a start frequency and an end frequency of each 1.8G uplink RB. If the UE requires more than one RB for a 1.8G uplink resource, a frequency range of each candidate contiguous resource block needs to be calculated. It is assumed that sequence numbers of candidate RBs that need to be allocated to UE are x to y (a first resource). A start frequency $f_{1.8start}$ and an end frequency $f_{1.8end}$ of the first resource may be calculated in the following manner:

$$f_{1.8RBStart}(x) = F_{1.8G} - \frac{BandWidth_{1.8G}}{2} + BandWidth_{1.8G} \times 5\% + x \times 0.18$$

$$f_{1.8RBEnd} = F_{1.8G} - \frac{BandWidth_{1.8G}}{2} + BandWidth_{1.8G} \times 5\% + (y+1) \times 0.18$$

x is an RB number, $f_{1.8RBstart}$ is a start frequency (that is, a first start frequency) corresponding to the candidate RB, and $f_{1.8RBEnd}$ is an end frequency (that is, a first end frequency) corresponding to the candidate RB.

703. The base station calculates harmonic frequency information of the uplink resource based on the frequency information of the uplink resource.

Specifically, for a manner in which the base station calculates main lobe and side lobe frequency information of a second harmonic corresponding to the candidate RB, that is, the 1.8G uplink resource, refer to the manner in which the main lobe and side lobe frequency information of the second harmonic corresponding to the 1.8G uplink resource is calculated in the embodiment shown in FIG. 5. Details are not described herein again.

704. The base station determines, based on the harmonic frequency information and the frequency information of the downlink resource, harmonic interference information between the downlink resource and the uplink resource.

Specifically, the base station may compare a frequency domain relationship between a second harmonic frequency location of each 1.8G candidate RB and the allocated 3.5G downlink resource, to determine an interference status of each 3.5G downlink RB.

For example, similar to the foregoing uplink-first coordinated scheduling manner, when one or both of the following two formulas are true, the base station may determine that the second harmonic main lobe of the 1.8G candidate resource block hits the allocated 3.5G downlink resource, that is, first harmonic interference exists between the candidate RB (that is, a to-be-allocated uplink resource) and the allocated 3.5G downlink resource:

$$f_{HarMainStart} \leq f_{3.5RBStart} \leq f_{HarMainEnd}$$

$$f_{HarMainStart} \leq f_{3.5RBStart} \leq f_{HarMainEnd}$$

When at least one of the following two formulas is true, the base station may determine that the second harmonic of the 1.8G candidate RB does not hit the allocated 3.5G downlink resource, that is, second harmonic interference exists between the candidate RB and the allocated 3.5G downlink resource, and interference intensity is the lowest or there is no interference:

$$f_{3.5RBStart} \geq F_{HarRightSideEnd}$$

$$f_{3.5BEnd} \leq f_{HarLeftSideStart}$$

When at least one of the following two formulas is true, the base station may determine that the second harmonic side lobe of the 1.8G candidate RB hits the allocated 3.5G downlink resource, that is, third harmonic interference exists between the candidate RB and the allocated 3.5G downlink resource:

$$f_{HarLeftSideStart} \leq f_{3.5RBStart} < f_{HarLeftSideEnd}$$

$$f_{HarLeftSideStart} < f_{3.5RBSEnd} \leq f_{HarLeftSideEnd}$$

$$f_{HarRightSideStart} \leq f_{3.5RBStart} < f_{HarRightSideEnd}$$

$$f_{HarRightSideStart} < f_{3.5RBEnd} \leq f_{HarRightSideEnd}$$

Optionally, if the 3.5G downlink resources are discontinuously allocated, two or more second harmonics may overlap in frequency domain. In this case, the base station needs to perform combination processing, and the base station may perform combination processing based on an area in which interference is more severe. For example, the allocated 3.5G downlink resources include an RB 1 and an RB 2. If the second harmonic main lobe of the candidate RB hits the allocated 3.5G downlink resource RB 1, and the second harmonic side lobe of the candidate RB hits the allocated 3.5G downlink resource RB 2, it may be determined that the second harmonic main lobe of the candidate RB hits the 3.5G downlink resource, that is, the first harmonic interference exists between the candidate RB and the allocated 3.5G downlink resource.

705. The base station modifies quality of the uplink resource based on the harmonic interference information.

706. The base station determines, in at least one modified candidate resource, an uplink resource used by the user equipment.

Figure 8B:
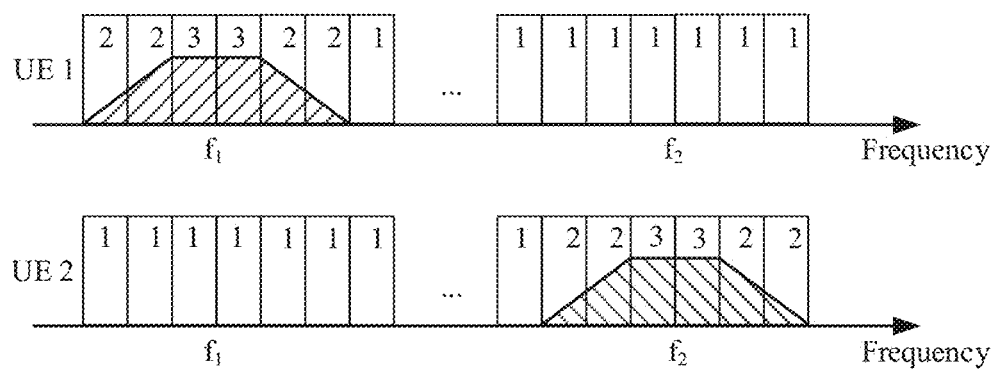
FIG. 8b is a schematic diagram of still another harmonic interference scenario according to an embodiment of the present invention.

Specifically, after determining second harmonic interference in each candidate 1.8G uplink resource, for example, an RB to the 3.5G allocated downlink resource, that is, whether a corresponding second harmonic resource area such as a main lobe, a side lobe, or a non-interference area hits the 3.5G downlink resource, the base station may modify quality of each candidate RB. It is assumed that quality of all 1.8G candidate RBs is the same when the 3.5G uplink resource is not scheduled or the second harmonic interference is not superimposed. After the second harmonic interference is considered, a 1.8G candidate RB corresponding to an RB in the non-interference area has the best quality, followed by a 1.8G candidate RB corresponding to an RB in the side lobe area, and finally a 1.8G candidate RB corresponding to an RB in the main lobe area, as shown in FIG. 8b. Therefore, the base station may select an uplink resource based on RB quality, for example, select an RB with best quality for the UE to perform uplink scheduling.

Figure 8C:
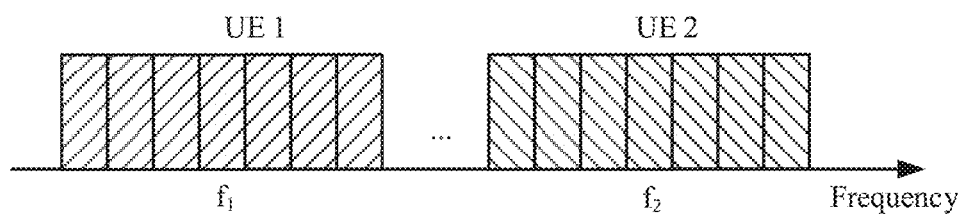
FIG. 8c is a schematic diagram of another resource scheduling according to an embodiment of the present invention.

Further, optionally, the base station may further select an RB for the UE based on information such as a resource priority, a service priority, and a user priority, to perform 1.8G uplink scheduling, as shown in FIG. 8c.

In this embodiment of the present invention, when allocating the uplink resource and the downlink resource to the UE, the base station may first perform downlink resource allocation of a high-frequency band carrier, and then perform uplink resource allocation of a low-frequency band. When allocating the uplink resource, whether second harmonic interference is caused to an allocated high-frequency band downlink spectrum is considered, an RB with a second harmonic that does not interfere with a downlink spectrum area is preferentially scheduled, and then an RB with a side lobe area only that causes interference to the downlink spectrum is scheduled. An RB that has a second harmonic main lobe area that causes interference to the downlink spectrum and that is generated by scheduling is avoided as far as possible. In this way, resource selection can be performed based on the harmonic interference information, which helps resolve a harmonic interference problem, improve resource selection reliability, and improve information transmission efficiency of a system.

In an optional embodiment, a network device such as a base station may perform uplink and downlink coordinated scheduling by flexibly selecting, based on a communication scenario, an uplink-first coordinated scheduling manner or a downlink-first coordinated scheduling manner, or in a predefined scheduling manner. This is not limited in this application.

The foregoing method embodiments are descriptions of examples of the interference determining method in this application. Each embodiment is described with emphasis. For a part that is not described in detail in an embodiment, refer to related descriptions in other embodiments.

Figure 9:
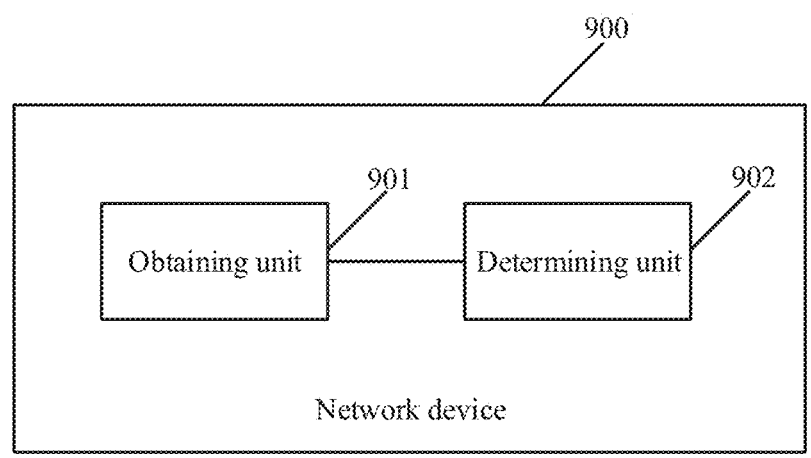
FIG. 9 is a schematic structural diagram of a network device according to an embodiment of the present invention.

FIG. 9 is a possible schematic structural diagram of a network device in the foregoing embodiments. Referring to FIG. 9, a network device 900 may include an obtaining unit 901 and a determining unit 902. These units may perform corresponding functions of the network device, for example, a base station, in the foregoing method examples. For example, the obtaining unit 901 is configured to obtain first frequency information of a first resource and second frequency information of a second resource, and a frequency indicated by the first frequency information is lower than a frequency indicated by the second frequency information; the determining unit 902 is configured to determine, based on the first frequency information, harmonic frequency information corresponding to the first resource; and the determining unit 902 is further configured to determine, based on the harmonic frequency information and the second frequency information, harmonic interference information between the first resource and the second resource.

Optionally, the first frequency information includes a first start frequency and a first end frequency.

When the determining unit 902 determines, based on the first frequency information, the harmonic frequency information corresponding to the first resource, the determining unit 902 may be specifically configured to: calculate, based on the first start frequency, a start frequency of a main lobe of a harmonic that corresponds to the first resource, and calculate an end frequency of the main lobe based on the first end frequency; and/or calculate a start frequency of a left side lobe of the harmonic based on the first start frequency and the first end frequency, and calculate an end frequency of the left side lobe based on the first start frequency; and/or calculate a start frequency of a right side lobe of the harmonic based on the first end frequency, and calculate an end frequency of the right side lobe based on the first start frequency and the first end frequency.

Optionally, the second frequency information includes a second start frequency and a second end frequency. When the determining unit 902 determines, based on the harmonic frequency information and the second frequency information, the harmonic interference information between the first resource and the second resource, the determining unit 902 may be specifically configured to:

determine that first harmonic interference exists between the first resource and the second resource when the second start frequency is greater than or equal to the start frequency of the main lobe and less than the end frequency of the main lobe; or determine that first harmonic interference exists between the first resource and the second resource when the second end frequency is greater than the start frequency of the main lobe and less than or equal to the end frequency of the main lobe; and determine that second harmonic interference exists between the first resource and the second resource when the second start frequency is greater than or equal to the end frequency of the right side lobe; or determine that second harmonic interference exists between the first resource and the second resource when the second end frequency is less than or equal to the start frequency of the left side lobe, where interference intensity of the first harmonic interference is higher than interference intensity of the second harmonic interference.

Further, optionally, the first resource is an allocated resource of user equipment, and the second resource is a candidate resource of the user equipment.

The determining unit 902 may be further configured to determine that third harmonic interference exists between the first resource and the second resource when the second resource is a resource that is different from a resource corresponding to the first harmonic interference and a resource corresponding to the second harmonic interference and that is in a candidate resource set, and the candidate resource set includes at least one second resource.

The interference intensity of the first harmonic interference is higher than interference intensity of the third harmonic interference, and the interference intensity of the third harmonic interference is higher than the interference intensity of the second harmonic interference.

Further, optionally, the first resource is a candidate resource of user equipment, and the second resource is an allocated resource of the user equipment.

The determining unit 902 may be further configured to: determine that third harmonic interference exists between the first resource and the second resource when the second start frequency is greater than or equal to the start frequency of the left side lobe and less than the end frequency of the left side lobe; and/or determine that third harmonic interference exists between the first resource and the second resource when the second end frequency is greater than the start frequency of the left side lobe and less than or equal to the end frequency of the left side lobe; and/or determine that third harmonic interference exists between the first resource and the second resource when the second start frequency is greater than or equal to the start frequency of the right side lobe and less than the end frequency of the right side lobe; and/or determine that third harmonic interference exists between the first resource and the second resource when the second end frequency is greater than the start frequency of the right side lobe and less than or equal to the end frequency of the right side lobe.

The interference intensity of the first harmonic interference is higher than interference intensity of the third harmonic interference, and the interference intensity of the third harmonic interference is higher than the interference intensity of the second harmonic interference.

Optionally, the allocated resource of the user equipment discrete resources.

The determining unit 902 may be further configured to: determine that the first harmonic interference exists between the first resource and the second resource when the first harmonic interference and the third harmonic interference exist between the first resource and the second resource; and/or determine that the first harmonic interference exists between the first resource and the second resource when the first harmonic interference and the second harmonic interference exist between the first resource and the second resource; and/or determine that the third harmonic interference exists between the first resource and the second resource when the second harmonic interference and the third harmonic interference exist between the first resource and the second resource.

Optionally, the determining unit 902 is further configured to modify quality of a candidate resource based on the harmonic interference information, and determine, in a candidate resource set, a resource used by the user equipment. The candidate resource is the first resource or the second resource, and the candidate resource set includes at least one modified candidate resource.

It should be noted that, in this embodiment of the present invention, unit division is an example, and is merely a logical function division. In actual implementation, another division manner may be used. Functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

Figure 10:
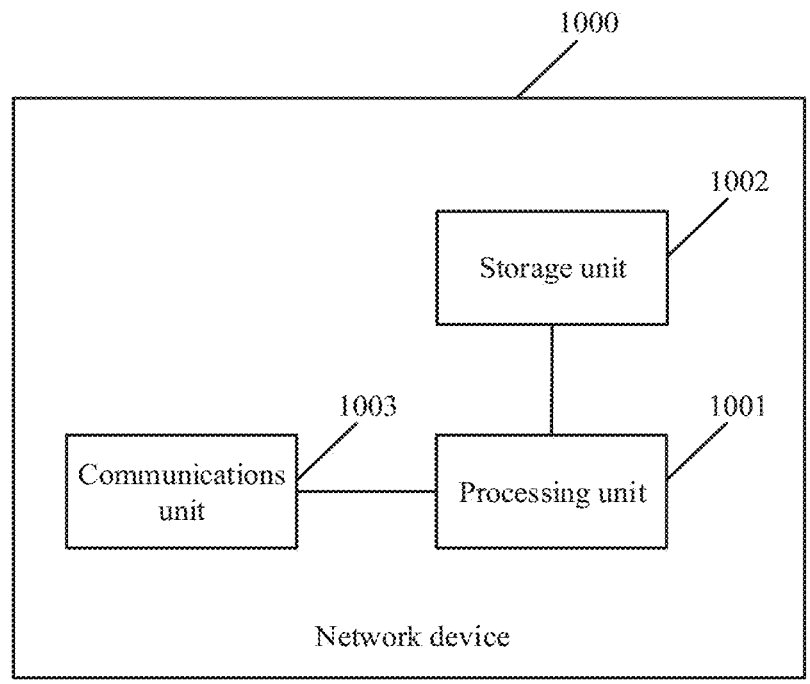
FIG. 10 is a schematic structural diagram of another network device according to an embodiment of the present invention.

When an integrated unit is used, FIG. 10 is another possible schematic structural diagram of the network device in the foregoing embodiments. As shown in FIG. 10, the obtaining unit and the determining unit may be integrated into a processing unit. A network device 1000 may include a processing unit 1001. The processing unit 1001 may be configured to control and manage an action of the network device. For example, the processing unit 1001 is configured to support the network device in performing processes 201 to 204 in FIG. 2, processes 501 to 506 in FIG. 5, processes 701 to 706 in FIG. 7, and/or another process of the technology described in this specification. The network device may further include a storage unit 1002 and a communications unit 1003. The storage unit 1002 may be configured to store program code and data of the network device, for example, store the foregoing frequency information. The communications unit 1003 may be configured to support communication between the network device and another network entity, for example, communication between the network device and a functional unit or a network entity such as user equipment shown in FIG. 2 to FIG. 9.

The processing unit 1001 may be a processor or a controller, such as a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logical device, a transistor logical device, a hardware component, or any combination thereof. The processor may implement or execute various example logical blocks, modules, and circuits described with reference to content disclosed in this application. The processor may also be a combination implementing a computing function, for example, a combination of one or more microprocessors, or a combination of a DSP and a microprocessor. The storage unit 1002 may be a memory. The communications unit 1003 may be a transceiver, or may be independently disposed as a receiver and/or a transmitter.

Figure 11:
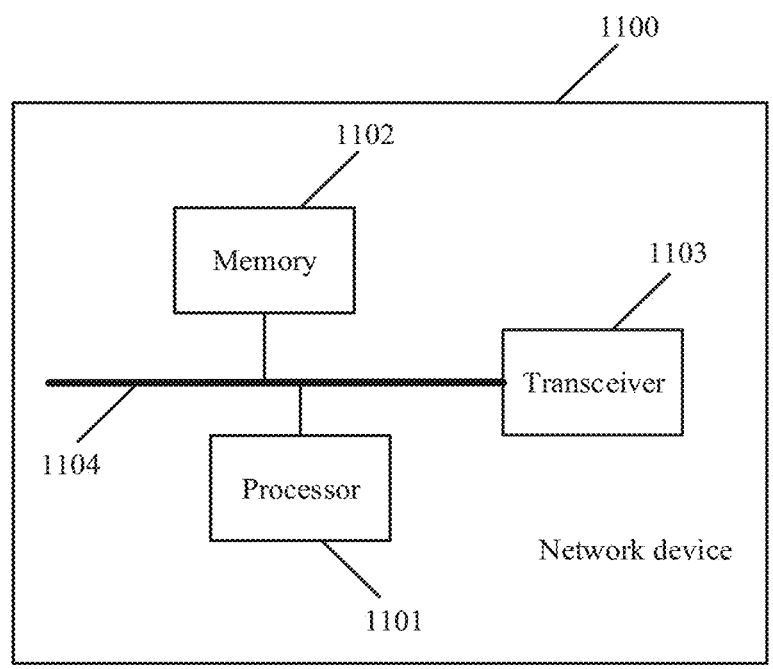
FIG. 11 is a schematic structural diagram of still another network device according to an embodiment of the present invention.

When the processing unit 1001 is a processor, the storage unit 1002 is a memory, and the communications unit 1003 is a transceiver, the network device in this embodiment of the present invention may be a network device shown in FIG. 11.

Referring to FIG. 11, a network device 1100 may include a processor 1101, a memory 1102, a transceiver 1103, and a bus 1104. The transceiver 1103, the processor 1101, and the memory 1102 are connected to each other by using the bus 1104. The bus 1104 may be a peripheral component interconnect (peripheral component interconnect, PCI for short) standard bus, an extended industry standard architecture (extended industry standard architecture, EISA for short) bus, or the like. The bus may be classified into an address bus, a data bus, a control bus, and the like. For ease of representation, only one thick line is used to represent the bus in FIG. 11, but this does not mean that there is only one bus or only one type of bus.

Method or algorithm steps described in combination with the content disclosed in this application may be implemented by hardware, or may be implemented by a processor by executing a software instruction. The software instruction may include a corresponding software module. The software module may be stored in a random access memory (Random Access Memory, RAM for short), a flash memory, a read-only memory (Read Only Memory, ROM), an erasable programmable read-only memory (Erasable Programmable ROM, EPROM), an electrically erasable programmable read-only memory (Electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a network device. Certainly, the processor and the storage medium may exist in the network device as discrete components.

In an implementation process, steps in the foregoing methods can be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be further understood that "first", "second", "third". "fourth", and various numerical symbols in this specification are merely used for differentiation for ease of description, and are not construed as a limitation on the scope of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of this application.

A person of ordinary skill in the art may be aware that, in combination with illustrative logical blocks (illustrative logical block) described in the embodiments disclosed in this specification and steps (step) may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

What is claimed is:

1. An interference determining method, comprising:
obtaining first frequency information of a first resource;
obtaining second frequency information of a second resource, wherein a frequency indicated by the first frequency information is lower than a frequency indicated by the second frequency information;
determining, based on the first frequency information, harmonic frequency information corresponding to the first resource; and
determining, based on the harmonic frequency information and the second frequency information, harmonic interference information between the first resource and the second resource, wherein the second frequency information comprises a second start frequency and a second end frequency, and wherein determining the harmonic interference information comprises:
determining that first harmonic interference exists between the first resource and the second resource if (1) the second start frequency is greater than or equal to the start frequency of the main lobe and less than the end frequency of the main lobe, or (2) the second end frequency is greater than the start frequency of the main lobe and less than or equal to the end frequency of the main lobe; and
determining that second harmonic interference exists between the first resource and the second resource if (1) the second start frequency is greater than or equal to the end frequency of a right side lobe, or (2) the second end frequency is less than or equal to the start frequency of a left side lobe, wherein interference intensity of the first harmonic interference is higher than interference intensity of the second harmonic interference.

2. The method according to claim 1, wherein the first frequency information comprises a first start frequency and a first end frequency, and the determining, based on the first frequency information, harmonic frequency information corresponding to the first resource comprises:
calculating, based on the first start frequency, a start frequency of a main lobe of a harmonic that corresponds to the first resource, and calculating an end frequency of the main lobe based on the first end frequency;
calculating a start frequency of the left side lobe of the harmonic based on the first start frequency and the first end frequency, and calculating an end frequency of the left side lobe based on the first start frequency; or
calculating a start frequency of the right side lobe of the harmonic based on the first end frequency, and calculating an end frequency of the right side lobe based on the first start frequency and the first end frequency.

3. The method according to claim 2, wherein the first resource is an allocated resource of user equipment, and the second resource is a candidate resource of the user equipment; and
the determining, based on the harmonic frequency information and the second frequency information, harmonic interference information between the first resource and the second resource further comprises:
determining that third harmonic interference exists between the first resource and the second resource if the second resource is a resource that is different from a resource corresponding to the first harmonic interference and a resource corresponding to the second harmonic interference and that is in a candidate resource set, wherein the candidate resource set comprises at least one second resource, and
the interference intensity of the first harmonic interference is higher than interference intensity of the third harmonic interference, and the interference intensity of the third harmonic interference is higher than the interference intensity of the second harmonic interference.

4. The method according to claim 3, wherein the allocated resource of the user equipment comprises at least two discrete resources; and
the determining, based on the harmonic frequency information and the second frequency information, harmonic interference information between the first resource and the second resource further comprises:
determining that the first harmonic interference exists between the first resource and the second resource if the first harmonic interference and the third harmonic interference exist between the first resource and the second resource;
determining that the first harmonic interference exists between the first resource and the second resource if the first harmonic interference and the second harmonic interference exist between the first resource and the second resource; and
determining that the third harmonic interference exists between the first resource and the second resource if the second harmonic interference and the third harmonic interference exist between the first resource and the second resource.

5. The method according to claim 2, wherein the first resource is a candidate resource of user equipment, and the second resource is an allocated resource of the user equipment; and
the determining, based on the harmonic frequency information and the second frequency information, harmonic interference information between the first resource and the second resource further comprises:
determining that third harmonic interference exists between the first resource and the second resource if the second start frequency is greater than or equal to the start frequency of the left side lobe and less than the end frequency of the left side lobe;
determining that third harmonic interference exists between the first resource and the second resource if the second end frequency is greater than the start frequency of the left side lobe and less than or equal to the end frequency of the left side lobe;
determining that third harmonic interference exists between the first resource and the second resource if the second start frequency is greater than or equal to the start frequency of the right side lobe and less than the end frequency of the right side lobe; or
determining that third harmonic interference exists between the first resource and the second resource if the second end frequency is greater than the start frequency of the right side lobe and less than or equal to the end frequency of the right side lobe, wherein
the interference intensity of the first harmonic interference is higher than interference intensity of the third harmonic interference, and the interference intensity of the third harmonic interference is higher than the interference intensity of the second harmonic interference.

6. The method according to claim 1, wherein after determining the harmonic interference information between the first resource and the second resource, the method further comprises:

modifying quality of a candidate resource based on the harmonic interference information, wherein the candidate resource is the first resource or the second resource; and determining, in a candidate resource set, a resource used by user equipment, wherein the candidate resource set comprises at least one modified candidate resource.

7. An apparatus for a network device, comprising:
at least one processor and a memory storing instructions executable by the at least one processor, wherein the instructions cause the at least one processor to:
obtain first frequency information of a first resource and second frequency information of a second resource, wherein a frequency indicated by the first frequency information is lower than a frequency indicated by the second frequency information;
determine, based on the first frequency information, harmonic frequency information corresponding to the first resource; and
determine, based on the harmonic frequency information and the second frequency information, harmonic interference information between the first resource and the second resource, wherein the second frequency information comprises a second start frequency and a second end frequency, and wherein determine the harmonic interference information comprises:
determining that first harmonic interference exists between the first resource and the second resource if (1) the second start frequency is greater than or equal to the start frequency of the main lobe and less than the end frequency of the main lobe, or (2) the second end frequency is greater than the start frequency of the main lobe and less than or equal to the end frequency of the main lobe; and
determining that second harmonic interference exists between the first resource and the second resource if (1) the second start frequency is greater than or equal to the end frequency of a right side lobe, or (2) the second end frequency is less than or equal to the start frequency of a left side lobe, wherein interference intensity of the first harmonic interference is higher than interference intensity of the second harmonic interference.

8. The apparatus according to claim 7, wherein the first frequency information comprises a first start frequency and a first end frequency; and wherein the instructions cause the at least one processor to:
calculate, based on the first start frequency, a start frequency of a main lobe of a harmonic that corresponds to the first resource, and calculate an end frequency of the main lobe based on the first end frequency;
calculate a start frequency of the left side lobe of the harmonic based on the first start frequency and the first end frequency, and calculate an end frequency of the left side lobe based on the first start frequency; or
calculate a start frequency of the right side lobe of the harmonic based on the first end frequency, and calculate an end frequency of the right side lobe based on the first start frequency and the first end frequency.

9. The apparatus according to claim 8, wherein the first resource is an allocated resource of user equipment, and the second resource is a candidate resource of the user equipment; and wherein the instructions cause the at least one processor to:
determine that third harmonic interference exists between the first resource and the second resource when the second resource is a resource that is different from a resource corresponding to the first harmonic interference and a resource corresponding to the second harmonic interference and that is in a candidate resource set, wherein the candidate resource set comprises at least one second resource; and
the interference intensity of the first harmonic interference is higher than interference intensity of the third harmonic interference, and the interference intensity of the third harmonic interference is higher than the interference intensity of the second harmonic interference.

10. The apparatus according to claim 9, wherein the allocated resource of the user equipment comprises at least two discrete resources; and wherein the instructions cause the at least one processor to:
determine that the first harmonic interference exists between the first resource and the second resource when the first harmonic interference and the third harmonic interference exist between the first resource and the second resource;
determine that the first harmonic interference exists between the first resource and the second resource when the first harmonic interference and the second harmonic interference exist between the first resource and the second resource; or
determine that the third harmonic interference exists between the first resource and the second resource when the second harmonic interference and the third harmonic interference exist between the first resource and the second resource.

11. The apparatus according to claim 8, wherein the first resource is a candidate resource of user equipment, and the second resource is an allocated resource of the user equipment; and wherein the instructions cause the at least one processor to:
determine that third harmonic interference exists between the first resource and the second resource when the second start frequency is greater than or equal to the start frequency of the left side lobe and less than the end frequency of the left side lobe;
determine that third harmonic interference exists between the first resource and the second resource when the second end frequency is greater than the start frequency of the left side lobe and less than or equal to the end frequency of the left side lobe;
determine that third harmonic interference exists between the first resource and the second resource when the second start frequency is greater than or equal to the start frequency of the right side lobe and less than the end frequency of the right side lobe; or
determine that third harmonic interference exists between the first resource and the second resource when the second end frequency is greater than the start frequency of the right side lobe and less than or equal to the end frequency of the right side lobe, wherein
the interference intensity of the first harmonic interference is higher than interference intensity of the third harmonic interference, and the interference intensity of the third harmonic interference is higher than the interference intensity of the second harmonic interference.

12. The apparatus according to claim 7, wherein the instructions cause the at least one processor to:
modify quality of a candidate resource based on the harmonic interference information, and determine, in a candidate resource set, a resource used by user equipment; and the candidate resource is the first resource or the second resource, and the candidate resource set comprises at least one modified candidate resource.

13. A computer-readable storage medium having a computer-readable program recorded thereon which, when executed by a processor, cause the processor to implement operations comprising:
   obtaining first frequency information of a first resource;
   obtaining second frequency information of a second resource, wherein a frequency indicated by the first frequency information is lower than a frequency indicated by the second frequency information;
   determining, based on the first frequency information, harmonic frequency information corresponding to the first resource; and
   determining, based on the harmonic frequency information and the second frequency information, harmonic interference information between the first resource and the second resource, wherein the second frequency information comprises a second start frequency and a second end frequency, and wherein determining the harmonic interference information comprises:
      determining that first harmonic interference exists between the first resource and the second resource if (1) the second start frequency is greater than or equal to the start frequency of the main lobe and less than the end frequency of the main lobe, or (2) the second end frequency is greater than the start frequency of the main lobe and less than or equal to the end frequency of the main lobe; and
      determining that second harmonic interference exists between the first resource and the second resource if (1) the second start frequency is greater than or equal to the end frequency of a right side lobe, or (2) the second end frequency is less than or equal to the start frequency of a left side lobe, wherein interference intensity of the first harmonic interference is higher than interference intensity of the second harmonic interference.

14. The computer-readable storage medium according to claim 13, wherein the first frequency information comprises a first start frequency and a first end frequency, and the determining, based on the first frequency information, harmonic frequency information corresponding to the first resource comprises:
   calculating, based on the first start frequency, a start frequency of a main lobe of a harmonic that corresponds to the first resource, and calculating an end frequency of the main lobe based on the first end frequency;
   calculating a start frequency of the left side lobe of the harmonic based on the first start frequency and the first end frequency, and calculating an end frequency of the left side lobe based on the first start frequency; or
   calculating a start frequency of the right side lobe of the harmonic based on the first end frequency, and calculating an end frequency of the right side lobe based on the first start frequency and the first end frequency.

15. The computer-readable storage medium according to claim 14, wherein the first resource is an allocated resource of user equipment, and the second resource is a candidate resource of the user equipment; and
   the determining, based on the harmonic frequency information and the second frequency information, harmonic interference information between the first resource and the second resource further comprises:
      determining that third harmonic interference exists between the first resource and the second resource if the second resource is a resource that is different from a resource corresponding to the first harmonic interference and a resource corresponding to the second harmonic interference and that is in a candidate resource set, wherein the candidate resource set comprises at least one second resource, and
   the interference intensity of the first harmonic interference is higher than interference intensity of the third harmonic interference, and the interference intensity of the third harmonic interference is higher than the interference intensity of the second harmonic interference.

16. The computer-readable storage medium according to claim 15, wherein the allocated resource of the user equipment comprises at least two discrete resources; and
   the determining, based on the harmonic frequency information and the second frequency information, harmonic interference information between the first resource and the second resource further comprises:
      determining that the first harmonic interference exists between the first resource and the second resource if the first harmonic interference and the third harmonic interference exist between the first resource and the second resource;
      determining that the first harmonic interference exists between the first resource and the second resource if the first harmonic interference and the second harmonic interference exist between the first resource and the second resource; and
      determining that the third harmonic interference exists between the first resource and the second resource if the second harmonic interference and the third harmonic interference exist between the first resource and the second resource.

17. The computer-readable storage medium according to claim 14, wherein the first resource is a candidate resource of user equipment, and the second resource is an allocated resource of the user equipment; and
   the determining, based on the harmonic frequency information and the second frequency information, harmonic interference information between the first resource and the second resource further comprises:
      determining that third harmonic interference exists between the first resource and the second resource if the second start frequency is greater than or equal to the start frequency of the left side lobe and less than the end frequency of the left side lobe;
      determining that third harmonic interference exists between the first resource and the second resource if the second end frequency is greater than the start frequency of the left side lobe and less than or equal to the end frequency of the left side lobe;
      determining that third harmonic interference exists between the first resource and the second resource if the second start frequency is greater than or equal to the start frequency of the right side lobe and less than the end frequency of the right side lobe; or
      determining that third harmonic interference exists between the first resource and the second resource if the second end frequency is greater than the start frequency of the right side lobe and less than or equal to the end frequency of the right side lobe, wherein
   the interference intensity of the first harmonic interference is higher than interference intensity of the third harmonic interference, and the interference intensity of the third harmonic interference is higher than the interference intensity of the second harmonic interference.

* * * * *